(12) United States Patent
Okazaki et al.

(10) Patent No.: US 7,406,882 B2
(45) Date of Patent: Aug. 5, 2008

(54) METER CABLE MOUNTING STRUCTURE

(75) Inventors: Yasunori Okazaki, Saitama (JP); Tetsuaki Maeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 11/389,147

(22) Filed: Mar. 27, 2006

(65) Prior Publication Data

US 2006/0234520 A1 Oct. 19, 2006

(30) Foreign Application Priority Data

Mar. 28, 2005 (JP) ............................. 2005-092224

(51) Int. Cl.
*G01L 3/02* (2006.01)
(52) U.S. Cl. ................................. 73/862.321
(58) Field of Classification Search ................................. 73/862.321–862.323
See application file for complete search history.

(56) References Cited

U.S. PATENT DOCUMENTS 4,045,625 A * 8/1977 Tsai ........................... 200/19.1
4,795,135 A * 1/1989 Scott ........................... 254/327
4,869,120 A * 9/1989 Kashiwai et al. ............... 74/12
6,595,994 B2 * 7/2003 Kilpela et al. ................. 606/74
6,962,209 B2 * 11/2005 Isaman et al. ................. 172/19

FOREIGN PATENT DOCUMENTS

JP 7-12971 U 3/1995

* cited by examiner

*Primary Examiner*—Max Noori
(74) *Attorney, Agent, or Firm*—Birch, Stewart, Kolasch & Birch, LLP

(57) ABSTRACT

A meter cable mounting structure having a shaft portion of an inner cable and a fitting hole of a revolving shaft that can be easily aligned for facilitating the mounting operation. The meter cable mounting structure includes a meter cable having an inner cable with a shaft portion of a square shape in cross section at least at one end thereof. A pinion includes a fitting hole of a square shape in cross section that corresponds to the shaft portion of the inner cable at the end thereof with a tapered inner wall portion being provided in a periphery of an open end of the fitting hole. The tapered inner wall portion is reduced in diameter gradually toward the open end and includes a guide projection for guiding the shaft portion when mounting the meter cable to the pinion by fitting the shaft portion into the fitting hole.

20 Claims, 5 Drawing Sheets

METER CABLE MOUNTING STRUCTURE

CROSS-REFERENCE TO RELATED APPLICATIONS

The present application claims priority under 35 USC 119 to Japanese Patent Application No. 2005-092224 filed on Mar. 28, 2005 the entire contents of which are hereby incorporated by reference.

FIELD OF THE INVENTION

The present invention relates to a mounting structure for a meter cable arranged, for example, between a meter and a rotation output unit such as a front wheel or an engine of a motorcycle for transmitting rotation of the rotation output unit to the meter.

DESCRIPTION OF BACKGROUND ART

An inner cable includes shaft portions having a square shape in cross section at both ends thereof that is rotatably stored in a meter cable. The shaft portion at one end of the inner cable is mounted, for example, to a pinion (revolving shaft) or the like that meshes a gear provided on a speed detecting portion of a front wheel or on a revolving speed detecting part of an engine of a motorcycle or the like. In addition, the shaft portion on the other side is mounted to a revolving shaft provided in a speed meter or a tachometer or the like. Mounting portions for the respective revolving shafts each are formed with a fitting hole of square shape in cross section that corresponds to the shaft portions of the inner cable for allowing transmission of the rotation thereof. In addition, a tapered inner wall portion that is reduced in diameter gradually toward an open end of the fitting hole is provided on a periphery of the open end.

The meter cable is mounted to the revolving shaft by inserting and fitting the shaft portion into the fitting hole while performing a centering between the shaft portion of the inner cable and the fitting hole of the revolving shaft in the tapered inner wall portion. See, for example, JP-UM-A-7-12971.

However, in the meter cable mounting structure in the related art, it is not easy to align the shaft portion of the inner cable and the fitting hole of the revolving shaft in phase when performing the centering of the shaft portion of the inner cable and the fitting hole of the revolving shaft in the tapered inner wall portion on the side of the revolving shaft.

Therefore, a problem arises wherein it is necessary to mount the meter cable while paying attention to the phase of the shaft portion of the inner cable and the fitting hole of the revolving shaft. Thus, time and efforts are required for the mounting operation.

SUMMARY AND OBJECTS OF THE INVENTION

In order to solve the problem described above, it is an object of the present invention to provide a meter cable mounting structure in which a shaft portion of an inner cable and a fitting hole of a revolving shaft can easily be aligned in phase, whereby a mounting operation of the meter cable can be facilitated.

In order to achieve the object described above, an embodiment of the present invention provides a meter cable mounting structure that includes a meter cable having an inner cable with shaft portions of a square shape in cross section at ends thereof. The inner cable is rotatably stored in the meter cable. A revolving shaft includes a fitting hole of a square shape in cross section that corresponds to the shaft portion of the inner cable at the end thereof and a tapered inner wall portion provided in a periphery of an open end of the fitting hole, the tapered inner wall portion being reduced in diameter gradually toward the open end, in which the meter cable is mounted to the revolving shaft by fitting the shaft portion of the inner cable into the fitting hole of the revolving shaft. The tapered inner wall portion of the revolving shaft is formed with a guide portion for guiding the shaft portion of the inner cable to the fitting hole of the revolving shaft.

According to an embodiment of the present invention, the guide portion is a guide projection formed at least on one side of the fitting hole out of four sides of square shape in cross section thereof from a substantially center position between adjacent corners toward the tapered inner wall portion.

According to an embodiment of the present invention, the guide portion is a guide wall portion extending along an inner wall surface on one side of the fitting hole of a square shape in cross section toward the tapered inner wall portion side and continuing to the tapered inner wall portion.

According to an embodiment of the present invention, the meter cable mounting structure includes the guide portion for guiding the shaft portion of the inner cable into the fitting hole of the revolving shaft that is provided on the tapered inner wall portion of the revolving shaft. The shaft portion of the inner cable is guided to the open end of the fitting hole of the revolving shaft along the guide portion with a distal end of the shaft portion of the inner cable being aligned with the fitting hole in phase at the open end. Thus, the mounting operation of the meter cable can be facilitated.

According to an embodiment of the present invention, the meter cable mounting structure includes the guide portion that is the guide projection provided on at least one side of the fitting hole out of the four sides of square shape in cross section thereof from substantially the center position between adjacent corners toward the tapered inner wall portion. The shaft portion of the inner cable can be guided to the open end of the fitting hole of the revolving shaft along the guide projection. Thus, the distal end of the shaft portion of the inner cable can be easily aligned with the fitting hole in phase.

According to an embodiment of the present invention, the meter cable mounting structure includes the guide portion that is the guide wall portion extending along the inner wall surface on one side of the fitting hole of square shape in cross section toward the tapered inner wall portion side and continuing to the tapered inner wall portion. Thus, the shaft portion of the inner cable can be easily guided to the open end of the fitting hole of the revolving shaft along the wall surface of the guide wall portion. Therefore, the distal end of the shaft portion of the inner cable and the fitting hole can be easily aligned in phase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
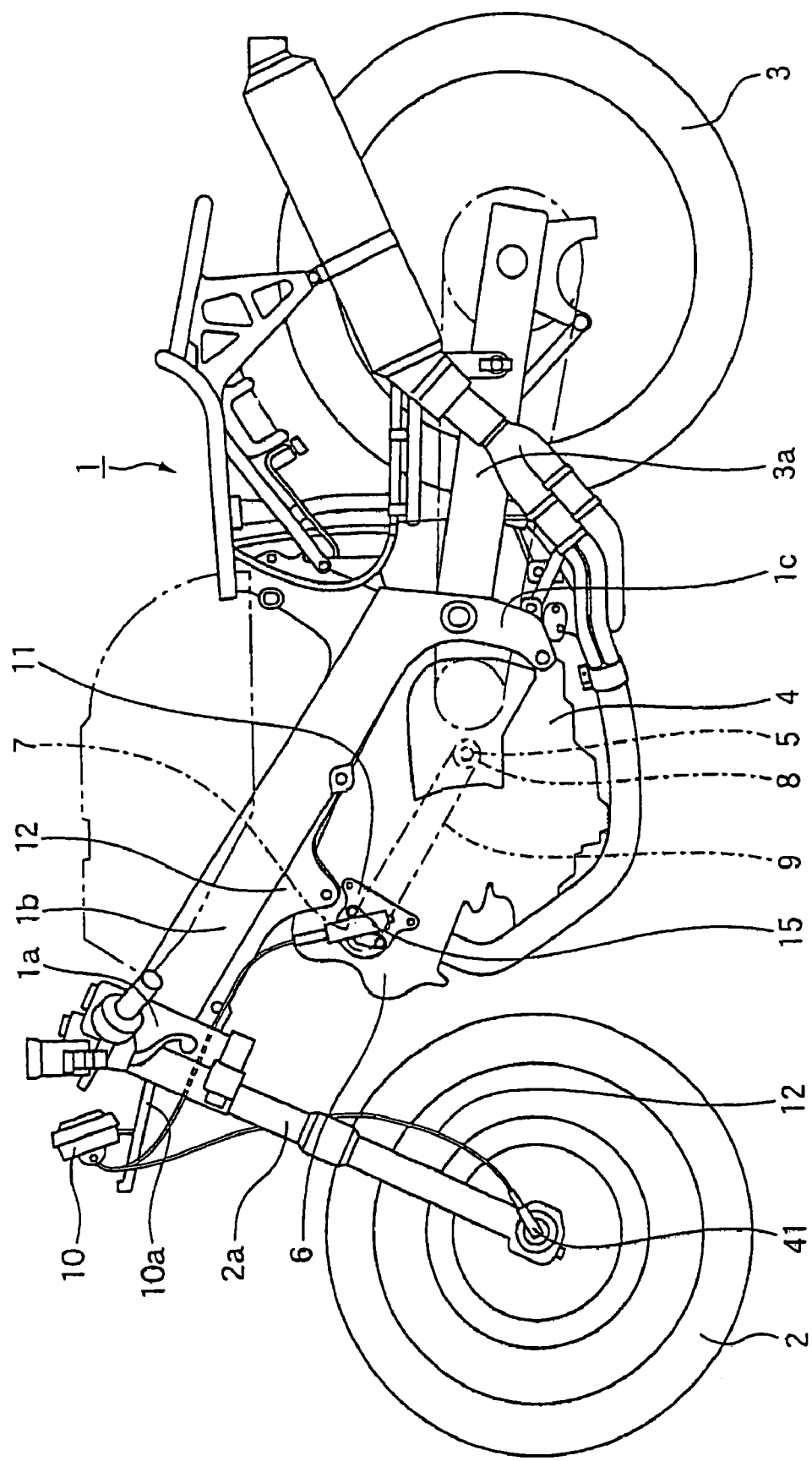
FIG. 1 is a side view of a motorcycle in which a meter cable mounting structure according to the present invention is employed.

Referring now to the drawings, an embodiment of a meter cable mounting structure according to the present invention will be described in detail.

Referring now to FIG. 1 to FIG. 6, a meter cable mounting structure according to the first embodiment of the present invention will be described. In this embodiment, a structure of a mounting portion between a meter cable and a gear case for detecting the rotation of a camshaft of an engine is taken as an example.

As shown in FIG. 1, a motorcycle 1 in which the meter cable mounting structure of the present invention is employed will be described first. The motorcycle 1 includes a main frame 1b extending rearwardly and downwardly from a head pipe 1a with a pivot plate 1c being bent downwardly and being formed at a rear end of the main frame 1b.

The head pipe 1a supports a front wheel 2 via a front fork 2a, and the pivot plate 1c supports a rear wheel 3 via a swing arm 3a. A meter box 10 in which a speed meter, a tachometer and the like are stored is mounted to a top bridge of the front fork 2a via a stay 10a extending toward the front.

Figure 2:
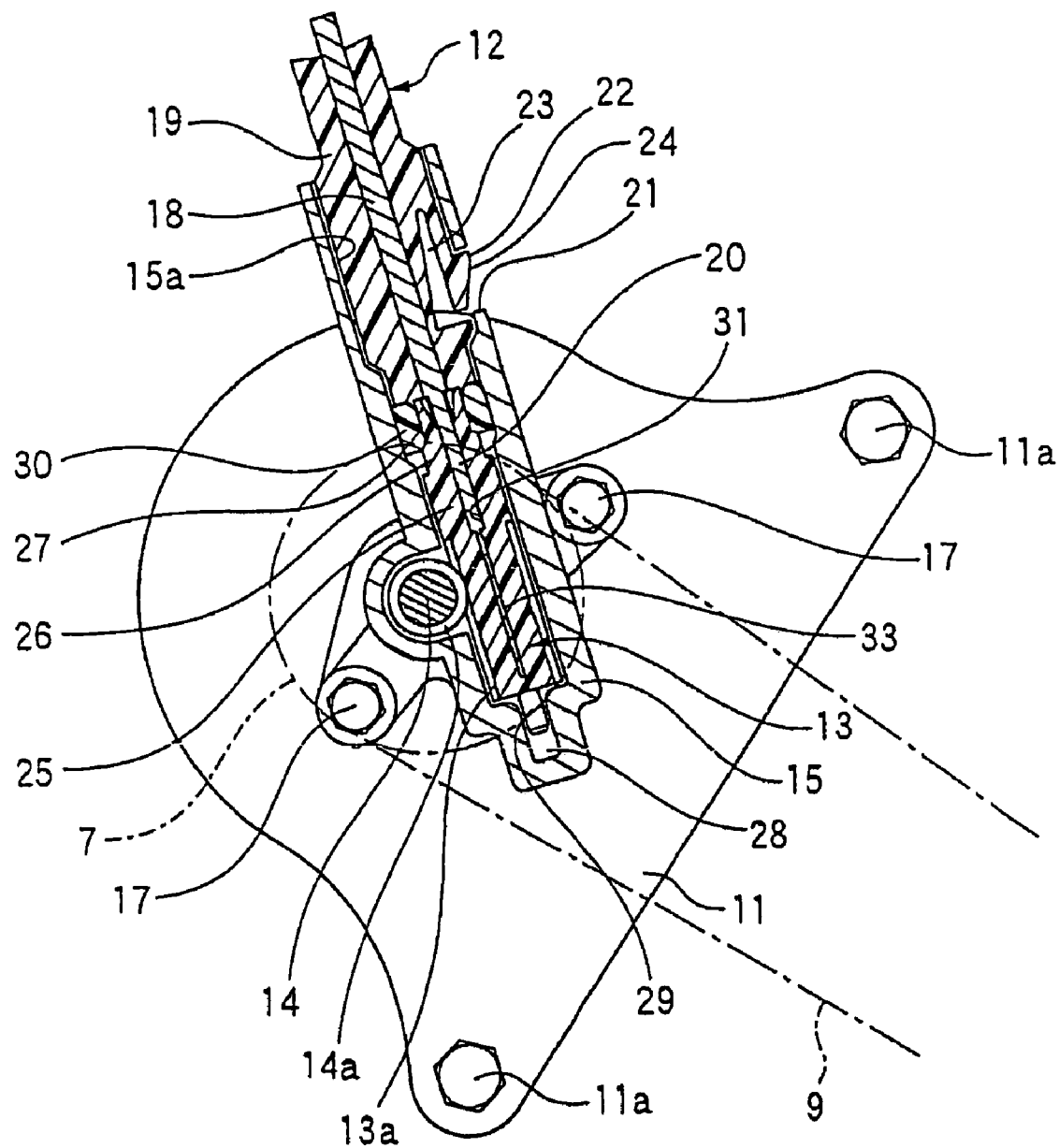
FIG. 2 is an explanatory side view, partly broken, showing the meter cable mounting structure according to a first embodiment of the present invention.

An engine 4 is mounted to the main frame 1b and the pivot plate 1c. The camshaft (not shown) is provided on a cylinder head 6 of the engine 4 in a state in which an axial line is oriented in the widthwise direction of the vehicle. As shown in FIG. 2, a cam-driven sprocket 7 is mounted to an end of the camshaft in a state of being covered by a cam sprocket cover 11 fixed to the cylinder head 6 with tightening bolts 11a.

By laying a roller chain 9 across the cam-driven sprocket 7 and a cam-drive sprocket 8 mounted to a crankshaft 5, the revolving speed of the crankshaft 5 is reduced to half and transmitted to the cam-driven sprocket 7 via the cam-drive sprocket 8 and the roller chain 9.

As shown in FIG. 2, a gear case 15 for deriving rotary power for the tachometer in the meter box 10 is fixed to an outer surface of the cam sprocket cover 11 with tightening bolts 17.

Stored in the gear case 15 are an input gear 14 connected to the camshaft via a joint or the like and a pinion (revolving shaft) 13 as an output gear that meshes the input gear 14.

By mounting one end of a meter cable 12 to the pinion 13 and mounting the other end thereof to the revolving shaft (not shown) of the tachometer in the meter box 10, the rotating power from the camshaft is transmitted to the tachometer via the input gear 14, the pinion 13 and the meter cable 12.

The meter cable 12 includes an inner cable 18 formed by winding a plurality of wire rods on a core wire such as a stainless wire or the like and an outer tube 19 for covering the inner cable 18 as shown in FIG. 2.

The inner cable 18 is rotatable in the outer tube 19, and shaft portions 20 of square shape in cross section are provided at both ends so as to project from end surfaces of the outer tube 19. The shaft portion 20 at one end is mounted to the pinion 13 and the shaft portion 20 at the other end is mounted to the revolving shaft of the tachometer.

The outer tube 19 is adapted to be fitted into an opening 15a of the gear case 15 at one end thereof, and is provided on an outer periphery of the fitting portion with an engaging projection 22 that engages with an engaging hole 21 provided on a wall portion of the gear case 15 as an example of coming-off-prevention and detent means for the meter cable 12. The engaging projection 22 is provided so as to be capable of resiliently deforming radially inwardly of the meter cable 12 via a notch 23 and project radially outwardly from an outer peripheral surface of the outer tube 19. An inclined surface 24 that inclines radially inwardly of the meter cable 12 is formed on an outer surface of the engaging projection 22.

Figure 3:
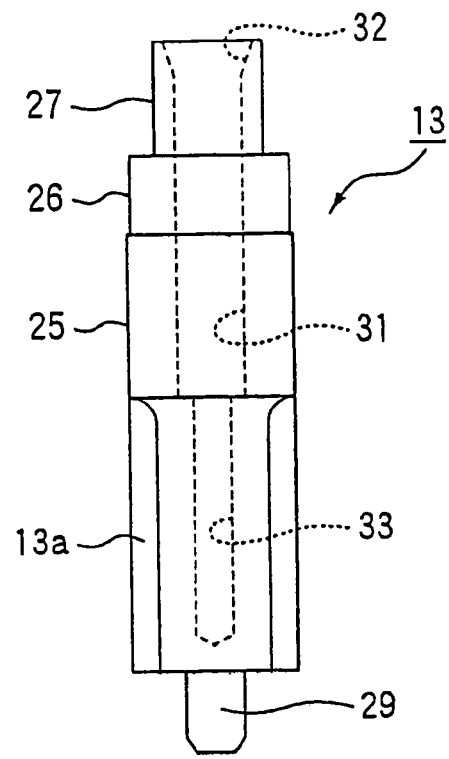
FIG. 3 is a side view of a single unit of a pinion shown in FIG. 2 viewed from radially outside.

As shown in FIGS. 2 and 3, the pinion 13 is formed with a large-diameter portion 25 which is long in the axial direction, a medium-diameter portion 26 and a small-diameter portion 27 which are relatively short, in sequence along the axial direction. A pin portion 29 which is to be rotatably inserted into a pin hole 28 formed on a bottom of the gear case 15 is concentrically formed on an end surface of the large-diameter portion 25. The large-diameter portion 25 is formed with teeth 13a to be meshed with teeth 14a of the input gear 14 on an outer peripheral surface of the end portion thereof on the side of the pin portion 29.

The small-diameter portion 27 is rotatably inserted into a bushing 30 whose outer peripheral portion is supported by the gear case 15. The bushing 30 is arranged substantially flush with an end surface of the small-diameter portion 27, so that the end surface of the outer tube 19 of the meter cable 12 which is to be fitted into the opening 15a of the gear case 15 comes into abutment therewith.

Figure 4:
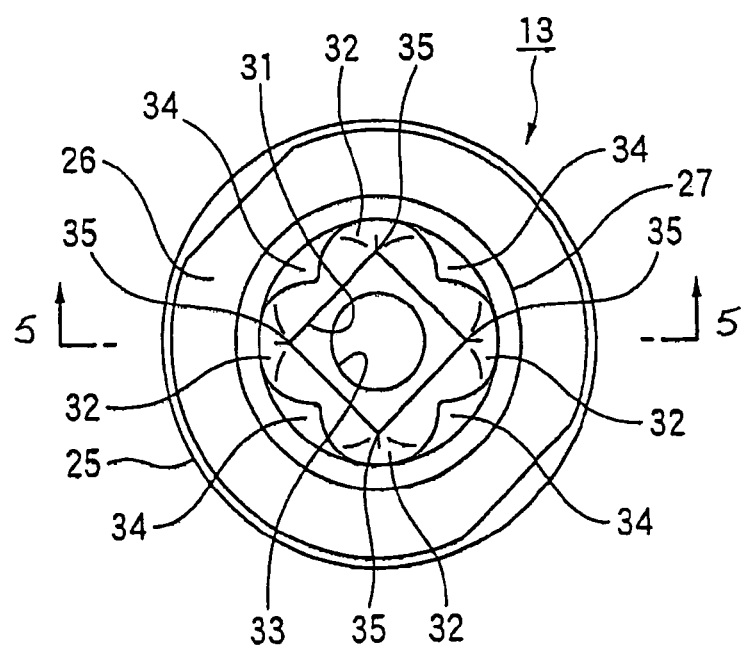
FIG. 4 is a plan view of the pinion shown in FIG. 3 viewed in the axial direction from the side of a tapered inner wall portion.
Figure 5:
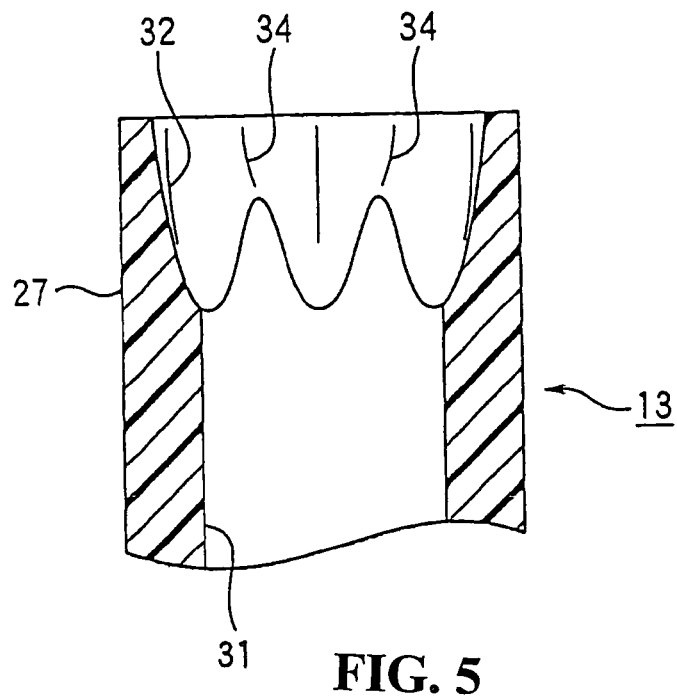
FIG. 5 is a cross-sectional view taken along the line 5-5 in FIG. 4.
Figure 6:
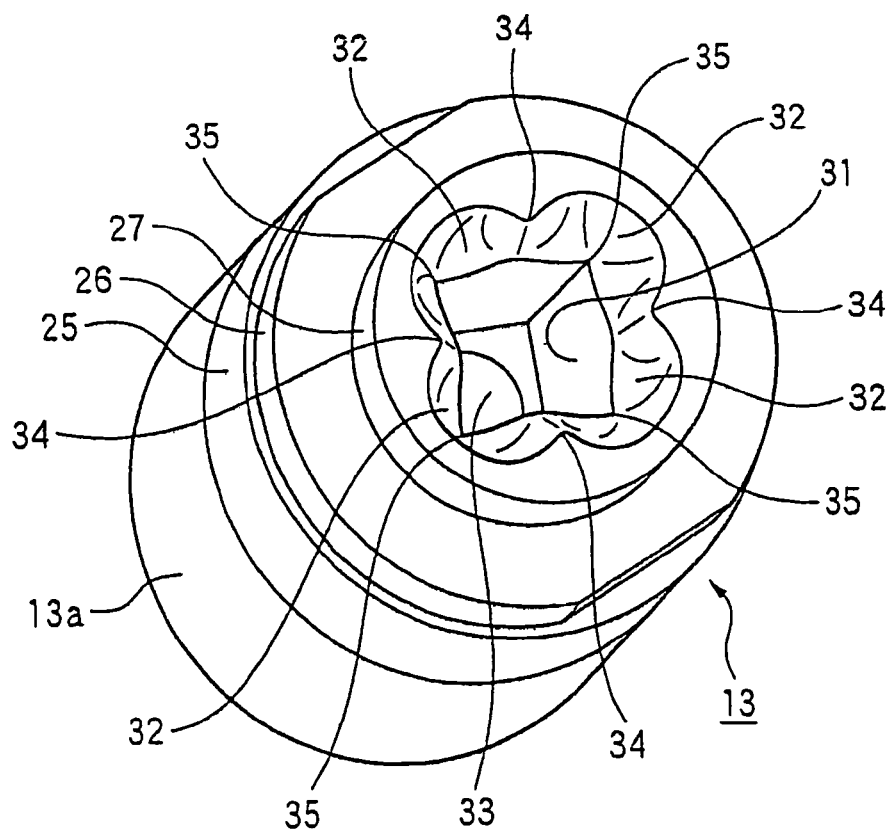
FIG. 6 is a perspective view of the pinion shown in FIG. 3 viewed from the side of the tapered inner wall portion.

A fitting hole 31 of a square shape in cross section corresponding to the square shape in cross section of the shaft portion 20 of the inner cable 18 is formed from a border with respect to the teeth 13a on the large-diameter portion 25 over the medium-diameter portion 26 and the small-diameter portion 27 in the pinion 13. The fitting hole 31 opens toward the small-diameter portion 27 with a tapered inner wall portion 32 which is reduced in diameter gradually toward the open end and being formed on a periphery of the open end, as shown in FIGS. 4 to 6. As illustrated in FIGS. 2 to 4 and FIG. 6, a molding hole 33 is provided for forming the teeth 13a on the outer peripheral surface of the end portion of the large-diameter portion 25.

In this embodiment, as shown in FIGS. 4 to 6, guide projections 34 for guiding the shaft portion 20 of the inner cable 18 to the fitting hole 31 of the pinion 13 are provided on the tapered inner wall portion 32 of the pinion 13. The guide projections 34 are provided on the fitting hole 31 on the four sides portions of the square shape in cross section from substantially center positions between adjacent corners 35 toward the tapered inner wall portion 32.

In order to mount the meter cable 12 to the gear case 15, an operator inserts the shaft portion 20 of the inner cable 18 of the meter cable 12 into the opening 15a of the gear case 15 together with the outer tube 19. Then, the shaft portion 20 of the inner cable 18 is guided along the guide projections 34 provided on the tapered inner wall portion 32 of the pinion 13 into the fitting hole 31. When the shaft portion 20 of the inner cable 18 is further advanced toward the fitting hole 31, a distal end of the shaft portion 20 of square shape in cross section is corrected in phase by the guide projections 34 at the open end of the fitting hole 31 of the square shape in cross section, and automatically aligned with the phase of the fitting hole 31. Then, the shaft portion 20 of the inner cable 18 is pushed in this state, whereby the shaft portion 20 is fitted to the fitting hole 31. Thus, the end of the meter cable 12 is mounted to the pinion 13.

When the shaft portion 20 of the inner cable 18 is inserted into the opening 15a of the gear case 15 together with the outer tube 19, the engaging projection 22 is pressed by an inner peripheral wall of the gear case 15 and slides on an inner peripheral wall in a state of being resiliently deformed radially inwardly. Then, at a timing when the shaft portion 20 of the inner cable 18 is fitted to the fitting hole 31 of the pinion 13, the engaging projection 22 is resiliently restored at the position of the engaging hole 21 and is engaged with the engaging hole 21. Thus, the meter cable 12 is prevented from coming off and rotating, so that the meter cable 12 is fixed to the gear case 15.

The engaging projection 22 can be easily released from the state of being engaged with the engaging hole 21 of the gear case 15 by being pushed from the outside radially inwardly of the outer tube 19. Thus, the meter cable 12 can be pulled out and disconnected easily from the gear case 15 by pushing the engaging projection 22 from the outside.

In the meter cable mounting structure according to the first embodiment described above, the tapered inner wall portion 32 of the pinion 13 is formed with the guide projections 34 for guiding the shaft portion 20 of the inner cable 18 into the fitting hole 31 of the pinion 13. In addition, the guide projections 34 are provided on the fitting hole 31 of the pinion 13 on the four sides of the square shape in cross section at substantially center positions between the adjacent corners 35 toward the tapered inner wall portion 32. Therefore, the shaft portion 20 of the inner cable 18 is guided to the open end of the fitting hole 31 of the pinion 13 along the guide projections 34. Thus, the distal end of the shaft portion 20 of the inner cable 18 and the fitting hole 31 can be easily aligned in phase at the open end. Accordingly, the mounting operation of the meter cable 12 can be facilitated.

Figure 7:
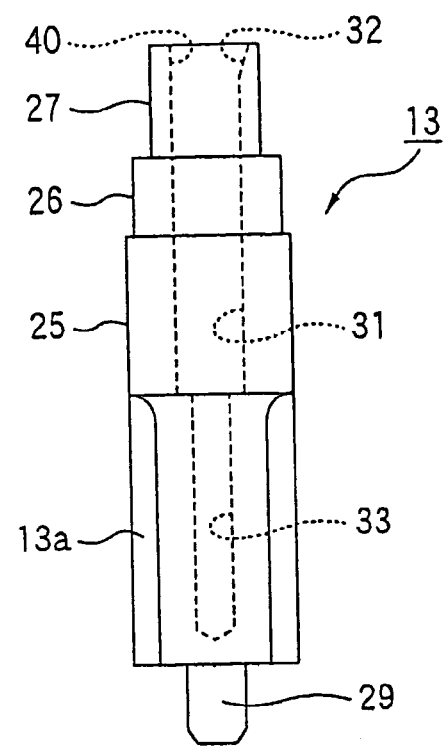
FIG. 7 is a side view of a single unit of a pinion used for a meter cable mounting structure according to a second embodiment of the present invention viewed from radially outside.
Figure 8:
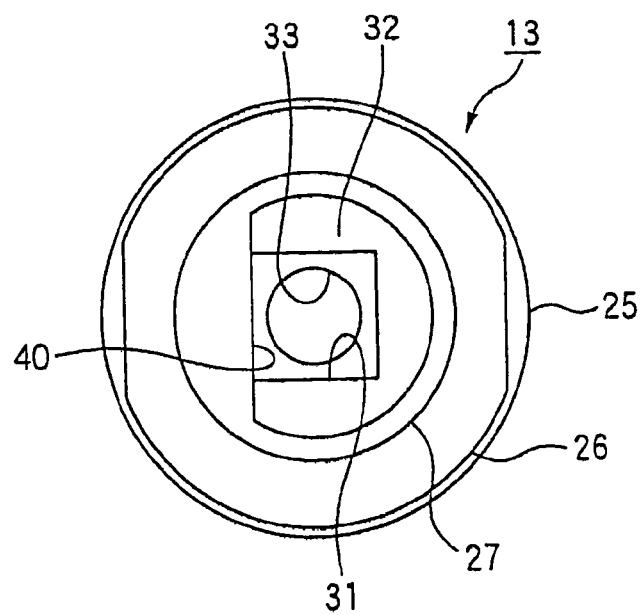
FIG. 8 is a plan view of the pinion shown in FIG. 7 viewed in the axial direction from the side of the tapered inner wall portion.

Referring now to FIGS. 7 and 8, a meter cable mounting structure according to a second embodiment of the present invention will be described. In this embodiment, a different point is only in that a guide wall portion 40 is provided on the tapered inner wall portion 32 in contrast to the structure in the first embodiment in which the guide projections 34 are provided on the tapered inner wall portion 32 of the pinion 13. Therefore, parts which overlap with the first embodiment will be represented by the same reference numerals and description thereof will be omitted or simplified.

As shown in FIGS. 7 and 8, the meter cable mounting structure according to this embodiment is such that the guide wall portion 40 for guiding the shaft portion 20 of the inner cable 18 into the fitting hole 31 of the pinion 13 is provided on the tapered inner wall portion 32 of the pinion 13. In addition, the guide wall portion 40 is provided so as to extend along an inner wall surface of the fitting hole 31 on one side of the square shape in cross section toward the tapered inner wall portion 32 and continues to the tapered inner wall portion 32.

In order to mount the meter cable 12 to the gear case 15, when inserting the shaft portion 20 of the inner cable 18 of the meter cable 12 into the opening 15a of the gear case 15 together with the outer tube 19, the operator inserts the shaft portion 20 toward the fitting hole 31 side so that the side surface of the shaft portion 20 of the inner cable 18 on one side of the square shape in cross section moves along a wall surface of the guide wall portion 40 provided on the tapered inner wall portion 32 of the pinion 13. Thus, the shaft portion 20 is guided into the fitting hole 31 in a state of being substantially aligned with the fitting hole 31 in phase, and the distal end of the shaft portion 20 of square shape in cross section is automatically aligned with the fitting hole 31 in phase at the open end of the fitting hole 31 of square shape in cross section. Thereafter, the operator pushes the shaft portion 20 of the inner cable 18 inward in this state and the shaft portion 20 is fitted into the fitting hole 31 whereby the meter cable 12 is mounted to the pinion 13.

In the meter cable mounting structure according to the second embodiment described above, the guide wall portion 40 for guiding the shaft portion 20 of the inner cable 18 to the fitting hole 31 of the pinion 13 is provided on the tapered inner wall portion 32 of the pinion 13. The guide wall portion 40 is provided so as to extend along the inner wall surface of the fitting hole 31 on one side of the square shape in cross section toward the tapered inner wall portion 32 and to continue to the tapered inner wall portion. Therefore, the shaft portion 20 of the inner cable 18 is guided to the open end of the fitting hole 31 of the pinion 13 along the guide wall portion 40, so that the distal end of the shaft portion 20 of the inner cable 18 can easily be aligned with the fitting hole 31 in phase at the open end. Accordingly, the mounting operation of the meter cable 12 can be facilitated.

Since other structures and effects and advantages are the same as the first embodiment, description will be omitted.

The present invention is not limited to the above-described embodiments, and may be modified in various manners as needed without departing the scope of the present invention.

For example, the case in which the present invention is applied to a structure in which one end of the meter cable 12 is mounted to the pinion 13 by fitting the shaft portion 20 at one end of the inner cable 18 to the fitting hole 31 of the pinion 13 which is interlocked with the camshaft as a rotation detecting part on the side of the engine 4 has been shown as an example. However, alternatively, or in addition, the present invention may be applied to a structure in which the shaft portion 20 at the other end of the inner cable 18 if fitted into the fitting hole provided on the revolving shaft of the tachometer in the meter box 10, and the other end of the meter cable 12 is mounted to the revolving shaft of the tachometer.

As shown in FIG. 1, the present invention may also be applied to a structure in which the shaft portion 20 at one end of the inner cable 18 of the meter cable 12 is fitted to the fitting hole of the pinion which is interlocked with a speed detecting part 41 on the front wheel side, whereby the one end of the meter cable 12 is mounted to the pinion. Alternatively, or in addition to it, the present invention may also be applied to a structure in which the shaft portion 20 at the other end of the inner cable 18 is fitted to the fitting hole provided on the revolving shaft of the speed meter in the meter box 10, and the other end of the meter cable 12 is mounted to the revolving shaft of the speed meter.

The material, shape, dimensions, mode, number, location and so on of the shaft portion, the inner cable, the meter cable, the fitting hole, the tapered inner wall portion, the revolving shaft, the guide portion, the guide projection and the guide wall portion shown in the embodiment described above may be chosen as desired as long as the present invention is achieved and are not limited.

The invention being thus described, it will be obvious that the same may be varied in many ways. Such variations are not to be regarded as a departure from the spirit and scope of the invention, and all such modifications as would be obvious to one skilled in the art are included within the scope of the claims.

What is claimed is:

1. A meter cable mounting structure comprising:
a meter cable having an inner cable with shaft portions of a square shape in cross section at ends thereof, the inner cable being rotatably stored in the meter cable; and
a revolving shaft having a fitting hole of a square shape in cross section that corresponds to the shaft portion of the inner cable at the end thereof and a tapered inner wall portion provided in a periphery of an open end of the fitting hole, the tapered inner wall portion being reduced in diameter gradually toward the open end, in which the meter cable is mounted to the revolving shaft by fitting the shaft portion of the inner cable into the fitting hole of the revolving shaft;
wherein the tapered inner wall portion of the revolving shaft is formed with a guide portion for guiding the shaft portion of the inner cable into the fitting hole of the revolving shaft.

2. The meter cable mounting structure according to claim 1, wherein the guide portion is a guide projection formed at least on one side of the fitting hole out of four sides of the square shape in cross section thereof from a substantially center position between adjacent corners toward the tapered inner wall portion.

3. The meter cable mounting structure according to claim 1, wherein the guide portion is a guide wall portion extending along an inner wall surface on one side of the fitting hole of square shape in cross section toward the tapered inner wall portion side and continuing to the tapered inner wall portion.

4. The meter cable mounting structure according to claim 1, wherein said meter cable includes an outer tube for covering said inner cable, said inner cable being rotatably mounted within said outer tube.

5. The meter cable mounting structure according to claim 4, wherein said shaft portions project from end surfaces of said outer tube.

6. The meter cable mounting structure according to claim 4, wherein said outer tube includes an engaging projection for mating with an aperture in a gear case for preventing the meter cable from being dislodged from the gear case.

7. The meter cable mounting structure according to claim 6, wherein said engaging projection includes a notch disposed adjacent thereto for enabling said engaging projection to be manually disengaged from said aperture for manually disengaging said meter cable from said gear case.

8. The meter cable mounting structure according to claim 1, wherein the revolving shaft is a pinion, said fitting hole being formed in said pinion, said pinion including a substantially long large-diameter portion, a medium-diameter portion and a small-diameter portion, which are relatively short as compared to said large-diameter portion, said tapered inner wall portion being formed within said small-diameter portion.

9. The meter cable mounting structure according to claim 8, and further including a bushing operatively mounted relative to said small-diameter portion, said bushing being disposed within a gear case for enabling rotation of said pinion and said inner cable relative to said gear case.

10. The meter cable mounting structure according to claim 1, wherein the guide portion includes a guide wall portion extending along an inner surface of the fitting hole on one side of the square shape in cross section and extends towards the tapered inner wall portion for guiding the inner cable into the fitting hole.

11. A meter cable mounting structure comprising:
a meter cable having an inner cable with a shaft portion of substantially a square shape in cross section at least at one end thereof, the inner cable being rotatably mounted relative to the meter cable;
a revolving shaft having a fitting hole of substantially a square shape in cross section that corresponds to the shaft portion of the inner cable at the end thereof;
a tapered inner wall portion being provided in a periphery of an open end of the fitting hole, the tapered inner wall portion being reduced in diameter gradually toward the open end, said meter cable being mounted to the revolving shaft by fitting the shaft portion of the inner cable into the fitting hole of the revolving shaft; and
a guide portion formed in the tapered inner wall portion of the revolving shaft for guiding the shaft portion of the inner cable into the fitting hole of the revolving shaft.

12. The meter cable mounting structure according to claim 11, wherein the guide portion is a guide projection formed at least on one side of the fitting hole out of four sides of the substantially square shape in cross section thereof from a substantially center position between adjacent corners toward the tapered inner wall portion.

13. The meter cable mounting structure according to claim 11, wherein the guide portion is a guide wall portion extending along an inner wall surface on one side of the fitting hole of square shape in cross section toward the tapered inner wall portion side and continuing to the tapered inner wall portion.

14. The meter cable mounting structure according to claim 11, wherein said meter cable includes an outer tube for covering said inner cable, said inner cable being rotatably mounted within said outer tube.

15. The meter cable mounting structure according to claim 14, wherein said shaft portion projects from at least one end surface of said outer tube.

16. The meter cable mounting structure according to claim 14, wherein said outer tube includes an engaging projection for mating with an aperture in a gear case for preventing the meter cable from being dislodged from the gear case.

17. The meter cable mounting structure according to claim 16, wherein said engaging projection includes a notch disposed adjacent thereto for enabling said engaging projection to be manually disengaged from said aperture for manually disengaging said meter cable from said gear case.

18. The meter cable mounting structure according to claim 11, wherein the revolving shaft is a pinion, said fitting hole being formed in said pinion, said pinion including a substantially long large-diameter portion, a medium-diameter portion and a small-diameter portion, which are relatively short as compared to said large-diameter portion, said tapered inner wall portion being formed within said small-diameter portion.

19. The meter cable mounting structure according to claim 18, and further including a bushing operatively mounted relative to said small-diameter portion, said bushing being disposed within a gear case for enabling rotation of said pinion and said inner cable relative to said gear case.

20. The meter cable mounting structure according to claim 11, wherein the guide portion includes a guide wall portion extending along an inner surface of the fitting hole on one side of the square shape in cross section and extends towards the tapered inner wall portion for guiding the inner cable into the fitting hole.

* * * * *